US00RE40214E

(19) United States
(12) Reissued Patent
Pellegrino

(10) Patent Number: US RE40,214 E
(45) Date of Reissued Patent: Apr. 8, 2008

(54) MOUNTING SYSTEM AND METHOD THEREFOR FOR MOUNTING AN ALIGNMENT INSTRUMENT ON A VEHICULAR WHEEL

(76) Inventor: Dean S. Pellegrino, 243 Lynn Oaks Ave., Thousand Oaks, CA (US) 91320

(21) Appl. No.: 11/108,152

(22) Filed: Apr. 15, 2005

Related U.S. Patent Documents

Reissue of:
(64) Patent No.: 6,622,389
Issued: Sep. 23, 2003
Appl. No.: 10/193,584
Filed: Jul. 10, 2002

(51) Int. Cl.
*G01B 5/255* (2006.01)

(52) U.S. Cl. ..... 33/203.18; 33/562
(58) Field of Classification Search ..... 33/203, 33/203.15, 203.16, 203.17, 203.18, 203.19, 33/203.2, 288, 562, 563, 566
See application file for complete search history.

(56) References Cited

U.S. PATENT DOCUMENTS 2,882,607 A * 4/1959 Binder ..... 33/203
3,426,991 A * 2/1969 Rishoud ..... 248/205.1
4,159,574 A * 7/1979 Samuelsson et al. .... 33/203.18
4,167,817 A * 9/1979 Hunter ..... 33/288
4,377,038 A * 3/1983 Ragan ..... 33/203.18
4,432,145 A * 2/1984 Caroff ..... 33/288
4,534,115 A * 8/1985 Kashubara ..... 33/203.18
5,168,632 A * 12/1992 Rimlinger, Jr. ..... 33/288
5,174,032 A * 12/1992 Beck ..... 33/203
5,242,202 A * 9/1993 Ettinger ..... 33/203.18
5,369,602 A * 11/1994 Naas et al. ..... 33/203.18
5,446,967 A * 9/1995 Gender ..... 33/203.18
5,625,953 A * 5/1997 Healy et al. ..... 33/203.18
5,987,761 A * 11/1999 Ohnesorge ..... 33/203.18
6,131,293 A * 10/2000 Maioli et al. ..... 33/203.18
6,282,799 B1 * 9/2001 Warkotsch ..... 33/203.18
6,313,911 B1 * 11/2001 Stieff ..... 33/288
6,507,988 B1 * 1/2003 Riviere ..... 33/203.19

* cited by examiner

*Primary Examiner*—G. Bradley Bennett
(74) *Attorney, Agent, or Firm*—Jack Munro; Sandy Lipkin

(57) ABSTRACT

A mounting system and method of mounting an alignment instrument onto a vehicular wheel which is to be used to align the wheels of a vehicle. The mounting system includes a mounting plate which has an engagement structure located directly adjacent the peripheral edge of the plate. At least a pair of the lug nuts of the vehicular wheel are to be removed and replaced with elongated internally threaded sleeves which are substantially longer in length than the lug nuts. A fastener assembly is used to fixedly mount the mounting plate onto these sleeves. The alignment instrument is then to be clamped onto the mounting plate by engaging the engagement structure.

12 Claims, 4 Drawing Sheets

MOUNTING SYSTEM AND METHOD THEREFOR FOR MOUNTING AN ALIGNMENT INSTRUMENT ON A VEHICULAR WHEEL

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to automotive vehicular service equipment and more particularly to a mounting system and method therefor for mounting a vehicular wheel alignment instrument in conjunction with the wheels of a vehicle.

2. Description of the Related Art

Proper alignment of vehicle wheels is necessary for smooth vibration-free handling of the vehicle and also so the vehicle doesn't have a tendency to drift one way or another on the road. Also, proper alignment of vehicle wheels is a necessary component for even tire wear. To accomplish vehicular alignment, it is necessary to establish the position of certain measurements in conjunction with each vehicle wheel. These measurements are camber, caster, steering axis inclination, and toe.

Typical present day alignment instruments utilize placing a separate alignment instrument (sensor) on each vehicular wheel. Each instrument has an emitter and a receiver. The emitter emits a signal which is transmitted to the receiver of another alignment instrument. The receiver will convert the signal into a value which is indicative of the corresponding alignment angle of the vehicle. This information can then be used by the mechanic to adjust the aforementioned measurements in order to achieve the correct and necessary alignment for the vehicular wheels.

Alignment instruments that are in widespread present day usage are normally mounted onto the tire rim of the vehicular wheel. Tire rims sometimes may be damaged and may be slightly out of round or may be slightly inclined relative to the wheel hub. Such damage frequently occurs by the tire and the rim coming into hard contact with an uneven roadway, such as a chuckhole or a curb. Using of the alignment instrument in conjunction with the tire rim does not achieve an accurate alignment because the rim itself is not correctly aligned relative to the wheel hub on which it is mounted.

Additionally, most tire rims, in years past, have been manufactured with an annular raised lip located directly adjacent the peripheral edge of the tire rim. The alignment instruments have been constructed to utilize that annular raised lip to mount the instrument onto the tire rim. Currently, some tire rims are no longer being manufactured with this annular raised lip. Therefore, there is no way to mount the alignment instrument onto the tire rim. The result is the mechanic doing the alignment just does a lot of "fudging" or "speculating" and guesses at what he or she hopes will be a correct alignment. The result is the alignment is of poor quality and proper handling of the vehicle is not obtained. Uneven tire wear is also obtained.

SUMMARY OF THE INVENTION

The subject matter of the present invention is directed to a mounting system for an alignment instrument for a vehicular wheel that mounts the alignment instrument directly to the wheel hub completely by passing the tire rim. If, per chance, the tire rim is out of round, it is immaterial. The particular constructional arrangement of the tire rim is of no matter.

The first basic embodiment of the present invention comprises a method of aligning a vehicular wheel which is achieved by the steps of removing at least two lug nuts of the vehicular wheel, installing in conjunction with the vehicular wheel at each location of a removed lug nut an elongated sleeve which is substantially longer in length than the removed lug nut, securing onto the sleeves by screw fasteners a mounting plate with their being an annular wall located directly adjacent to and spaced slightly from the peripheral edge of the plate. The screw fasteners are to be tightened so that the mounting plate is tightly mounted on the wheel hub of the vehicular wheel and then installing a conventional aligning instrument in a fixed position onto the mounting plate by being pressed tightly against the annular wall.

A further embodiment of the present invention is where the first basic embodiment is modified by forming the mounting plate in a circular configuration.

A further embodiment of the present invention is where the first basic embodiment is modified by the annular wall being formed by a groove formed within the mounting plate.

A second basic embodiment of the present invention comprises a mounting system for an alignment instrument for a vehicular wheel which comprises a mounting plate with this mounting plate having a peripheral edge. An engagement means is located on the mounting plate directly adjacent this peripheral edge. A spacing means is used for mounting the mounting plate in a spaced position from the vehicular wheel and in juxtaposition to the vehicle wheel and in a fixed relationship to the vehicle wheel. A fastener assembly is secured to the spacing means, the fastener assembly connecting with the mounting plate. An alignment instrument is to be clamped onto the mounting plate and it is forced outwardly against the engagement means.

A further embodiment of the present invention is where the second basic embodiment is modified by the mounting plate being circular.

A further embodiment of the present invention is where the just previous embodiment is modified by the engagement means being defined as an annular groove.

A further embodiment of the present invention is where the first basic embodiment is modified by the spacing means being defined as a plurality of sleeves each of which has an internally threaded through opening.

A further embodiment of the present invention is where the just previous embodiment is modified by the sleeves being all of the same length.

A third basic embodiment of the present invention is defined as a mounting system which is adapted to mount an alignment instrument on a vehicular wheel with this vehicular wheel being fixedly mounted on a wheel hub. A mounting plate, which has a peripheral edge, has an engagement means located directly adjacent this peripheral edge. A spacing means mounts the mounting plate on the wheel hub and fixedly mounts the mounting plate in a spaced position from the vehicular wheel. A fastener assembly is secured to the spacing means with this fastener assembly connecting also with the mounting plate. An alignment instrument is to be clamped onto the mounting plate by engaging with this engagement means.

A further embodiment of the present invention is where the third basic embodiment is modified by the mounting plate being formed circular.

A further embodiment of the present invention is where the just previous embodiment is modified the engagement means being defined as an annular groove.

A further embodiment of the present invention is where the just previous embodiment is modified by the spacing means being defined as a series of sleeves each of which has an internally threaded through opening.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF THE INVENTION

Figure 1:
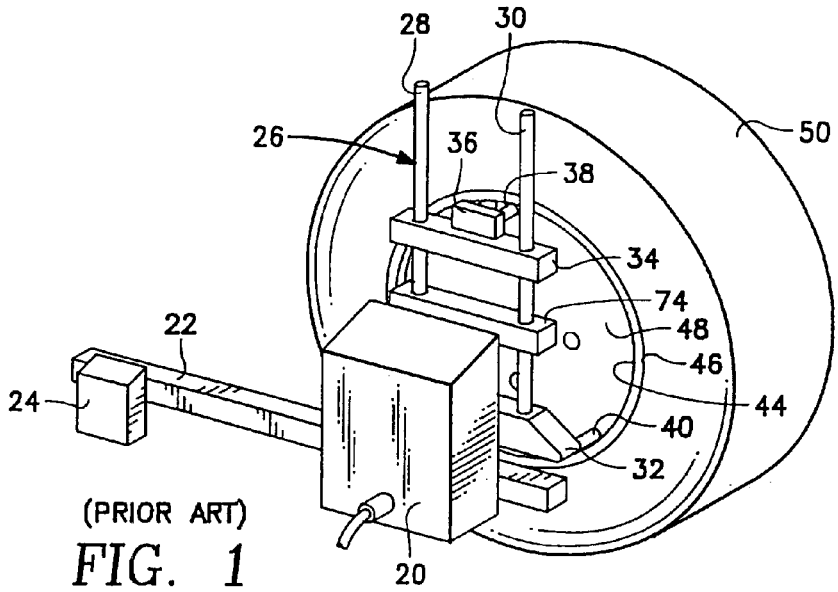
(PRIOR ART) FIG. 1
FIG. 1 is an isometric view showing a prior art mounting of a typical alignment instrument in conjunction with a prior art tire rim of a vehicular wheel.

Referring particularly to the drawings, there is shown in FIG. 1 a conventional alignment instrument which is generally referred to as an aligning sensing head 20. The specific construction of the sensing head 20 does not constitute any specific part of this invention. Mounted in conjunction with the sensing head 20 is a bar 22. Mounted on the bar 22 is a reflector 24. Again, the bar 22 and reflector 24 form no specific part of this invention.

The sensing head 20 is mounted on a mounting frame 26. The mounting frame 26 includes a pair of parallel spaced apart rods 28 and 30. Slidably mounted on the rods 28 and 30 is a bottom crossbar 32 and an upper crossbar 34. The sensing head 20 is mounted on a support bar 74. The support bar 74 is mounted on the rods 28 and 30. The sensing head 20 is to be adjustable on the rods 28 and 30 by being slidable thereon by sliding the support bar 76 on the rods 28 and 30. Mounted on the upper crossbar 34 is a block 36. Mounted on the block 36 is a pair of fingers 38. Mounted on the bottom crossbar 32 are a pair of fingers 40 and 42. The fingers 38, 40 and 42 are to be pressed tightly against the inside surface 44 of the peripheral edge 46 of a tire rim 48. This clamping arrangement for the sensing head 20 securely mounts the sensing head 20 in a fixed relationship on the tire rim 48. This type of conventional mounting for the sensing head 20 requires that the tire rim 48 have an inside surface 44 that is basically transversely positioned relative to the frontal planar surface of the tire rim 48. If there is no such surface 44, there is no way to mount the sensing head 20 onto the tire rim 48. A tire 50 will normally be mounted on the tire rim 48.

Figure 2:
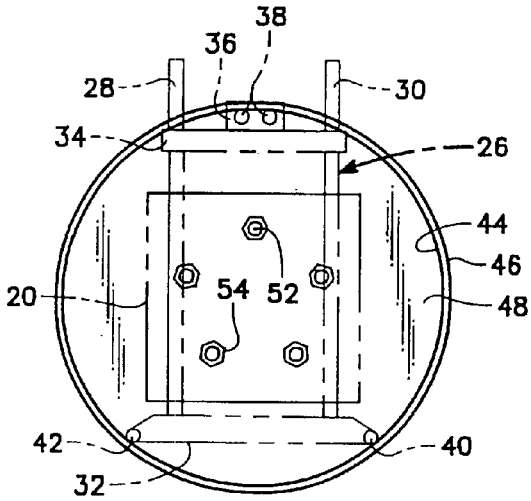
(PRIOR ART) FIG. 2
FIG. 2 is a side view depicting in more detail how the alignment instrument of the prior art is mounted in conjunction with the tire rim.
Figure 3:
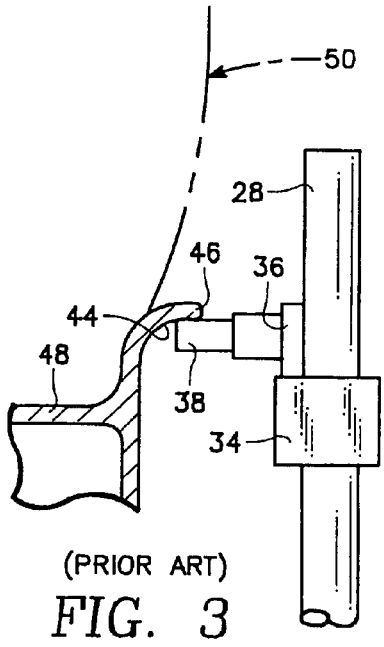
(PRIOR ART) FIG. 3
FIG. 3 is a cross-sectional view through the prior art tire rim showing the relationship of a mounting finger of the alignment instrument in conjunction with the peripheral edge of the tire rim.
Figure 4:
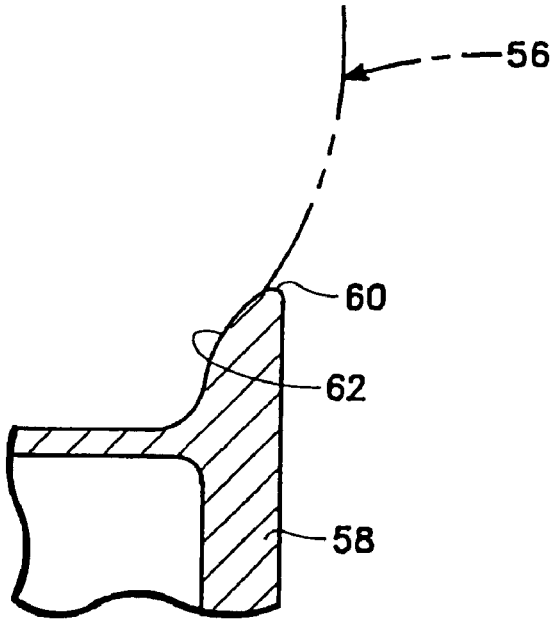
FIG. 4 is a cross-sectional view of a tire rim which is being used to a greater extent in present day society where there is no annular wall or raised lip directly adjacent the peripheral edge of the tire rim.
Figure 5:
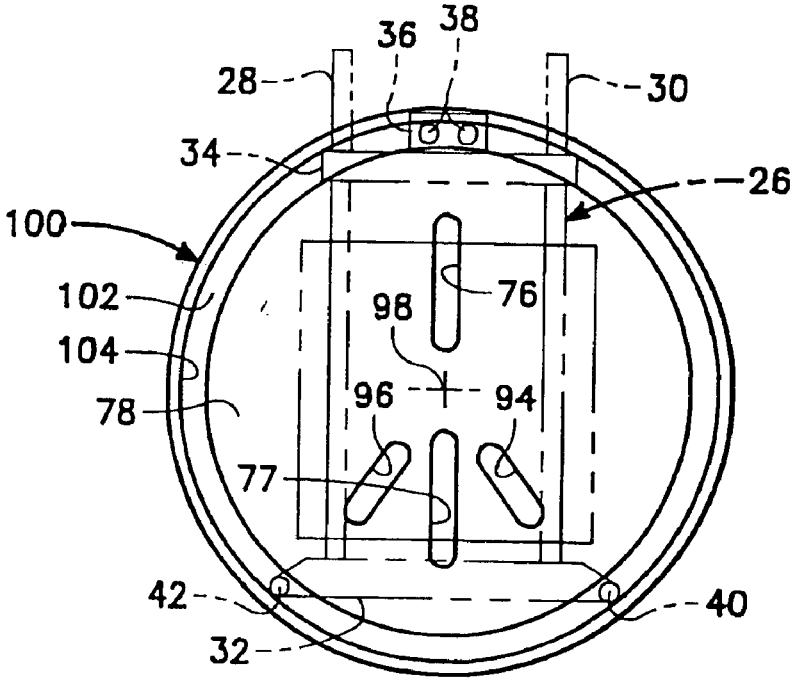
FIG. 5 is a view similar to FIG. 2 but where the mounting system of the present invention is utilized.

Utilizing of the conventional alignment instrument structure, shown in FIGS. 1–3, any misalignment of the tire rim 48 is not compensated for by the aligning instrument mounting structure shown in FIGS. 1–3. In other words, the mounting structure for the sensing head 20 aligns the vehicle wheel according to the tire rim and not the wheel hub on which the tire rim is mounted. The tire rim 48 is fixedly mounted to the wheel hub by means of a series of lug bolts 52 with there being five in number of such lug bolts 52 shown in FIG. 2. Each lug bolt 52 engages with a nut 54 which securely mounts the tire rim 50 onto the wheel hub. Again, the wheel hub is deemed to be conventional and forms no specific part of this invention. It is to be understood that there is a nut 54 for each lug bolt 52.

Referring particularly to FIGS. 4–11 of the drawings, there is shown a vehicular tire 56 which is mounted on a tire rim 58. The tire rim 58 has a peripheral edge 60. Adjacent the peripheral edge 60 is a mounting annular surface 62. The tire 56 is to be mounted directly against the surface 62. The tire rim is to be securely mounted by a plurality of lug bolts 70 that engage with lug bolt holes 64. Nuts, which are not shown, are to be engaged with each lug bolt located within lug bolt hole 64, and when tightened securely fix in position the tire rim 58 onto the wheel hub. It is to be noted that the tire rim 58 does not include any outwardly extending transverse surface directly adjacent the peripheral edge 60. The tire rim 58 is smoothly contoured and there is no surface on which to mount the sensing head 20 as was accomplished in FIGS. 1–3. Therefore, some other structure has to be utilized in order to mount the sensing head 20 on the tire rim 58. This other structure is as follows:

Two of the lug bolts 64 that engage with the lug holes 54 are removed and each are replaced with a sleeve 66 which has an internally threaded through hole 68. The sleeve 66 is generally about three to four inches in length which is at least three to four times the length of the lug bolt nut which has been removed in order to threadably mount the sleeve 66 on the lug bolt 70. At the opposite end of the through hole 68 there is threadably engaged a connecting bolt 72. The connecting bolt 72 extends outwardly from the sleeve 66.

A single connecting bolt 72 is conductible through elongated holes 76 and 77 formed within a mounting plate 78. Once a bolt 72 passes through either elongated hole 76 or 77, a washer 80 and a nut 82 is to be attachable to the bolt 72 and tightly secured thereto. The mounting plate 78 can be adjusted prior to tightening of the nuts 82 because the holes 76 are oversized by being elongated. Normally, the mounting plate 78 is to be centrally mounted relative to the tire rim 58, and when that center position is achieved, then the nuts 82 are tightened.

Figure 6:
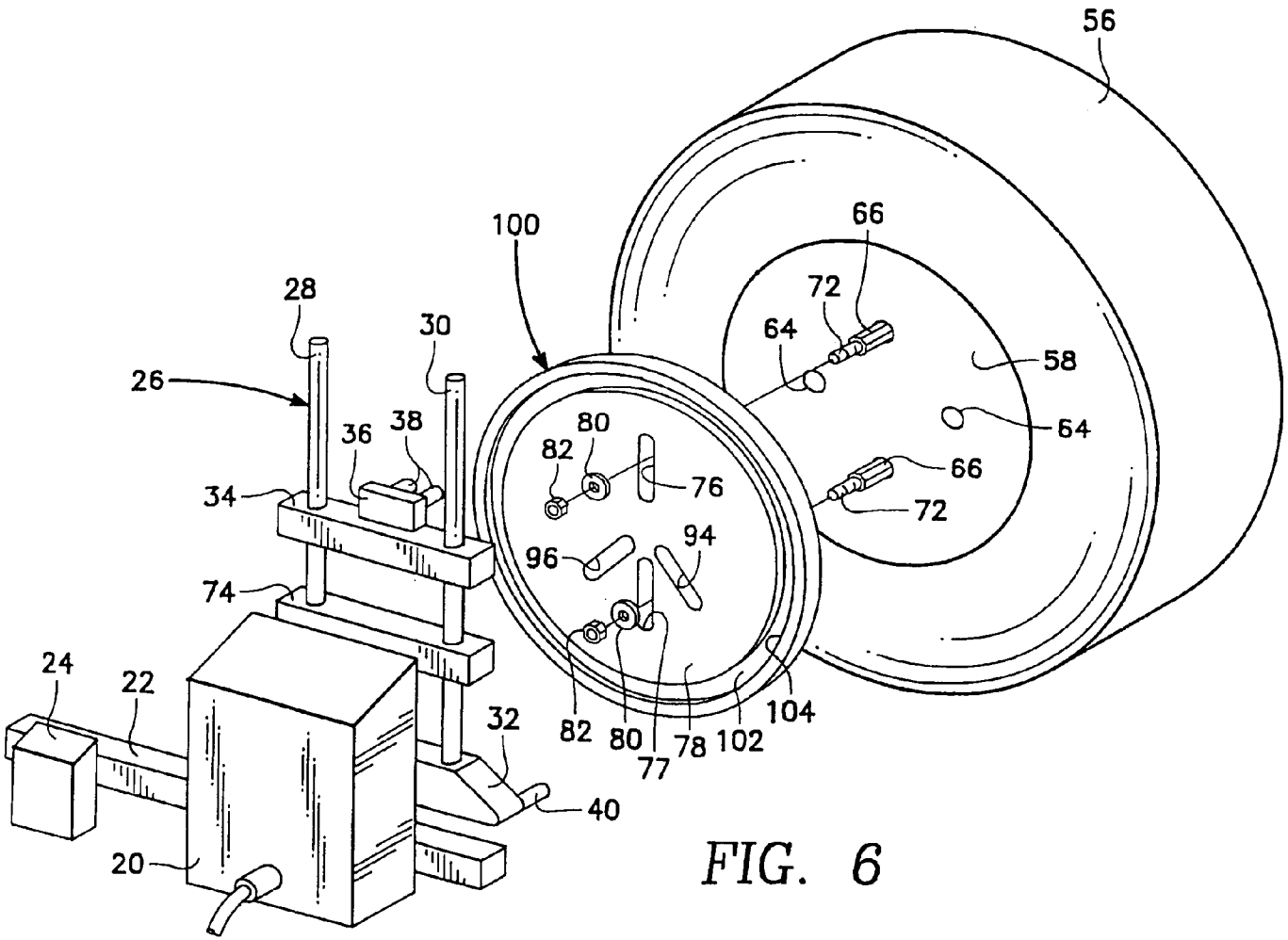
FIG. 6 is an isometric exploded view of the mounting of an alignment instrument in conjunction with a vehicular tire using the system of the present invention.
Figure 7:
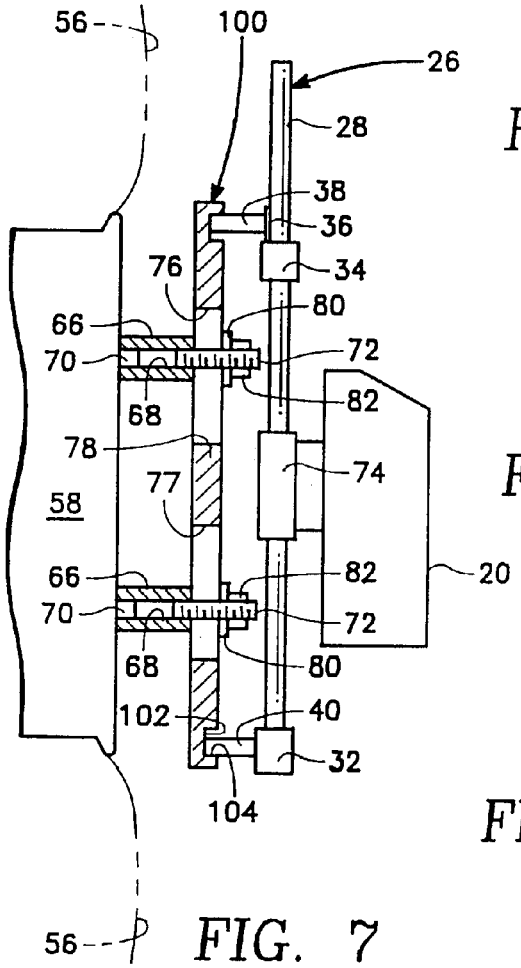
FIG. 7 is a transverse cross-sectional view through the mounting system of the present invention showing how the alignment instrument is mounted in conjunction with the vehicular wheel hub bypassing the tire rim.
Figure 8:
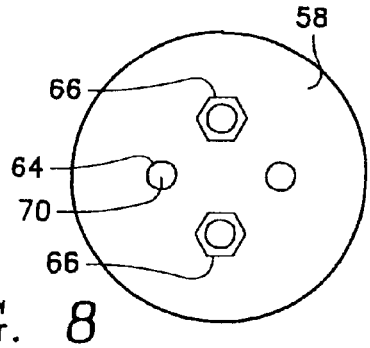
FIG. 8 is a schematic view of a tire rim mounted on a wheel hub which has four lug bolts.
Figure 9:
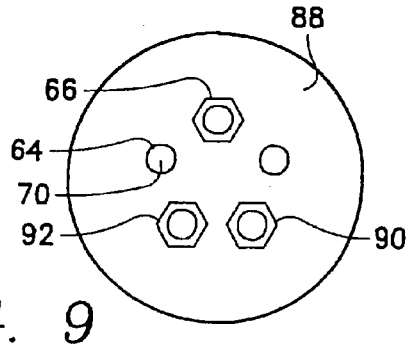
FIG. 9 is a schematic view of a tire rim mounted on a wheel hub which has five lug bolts.
Figure 10:
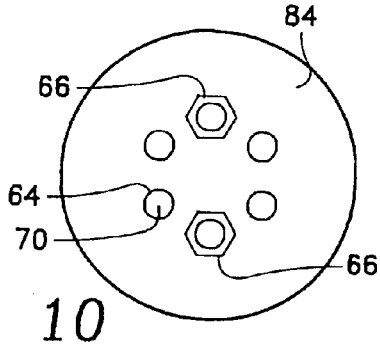
FIG. 10 is a schematic view of a tire rim mounted on a wheel hub which has six lug bolts.
Figure 11:
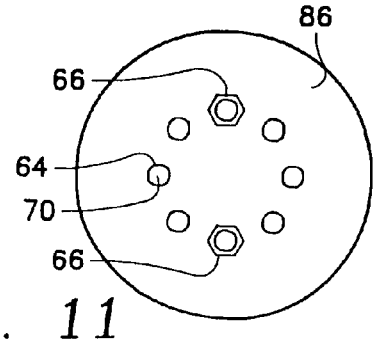
FIG. 11 is a schematic view of a tire rim mounted on a wheel hub which has eight lug bolts.

The elongated holes 76 and 77 are to be utilized when there is a four in number of equally spaced apart lug bolt pattern 70, which is shown in FIGS. 6 and 8. This way, only two of the lug bolt nuts 70 are removed and these two are to be in alignment with each other passing through the center of the lug bolt pattern. Any two aligned lug bolts 70 can be used. As there are two in number of sets of aligned lug bolts 70 in any four lug bolt pattern, such as shown in FIGS. 6 and 8. The mounting plate 78 is also similarly mounted on two similarly aligned lug bolts when utilizing of a six in number lug bolt pattern, such as shown in FIG. 10, which is utilized in conjunction with a tire rim 84. The same pair of two aligned lug bolts is also to be used in conjunction with a tire rim 86, which is shown in FIG. 11, where there is an eight in number of lug bolt pattern. However, if there is a five in number lug bolt pattern, as shown in tire rim 88 of FIG. 9, there are actually three in number of lug bolts 70 that are used with sleeves 90 and 92 which are not in alignment with sleeve 66. The connecting bolt 72 of sleeve 90 is to connect with elongated slot 94 and another connecting bolt 72 connects with elongated slot 96. Slots 94 and 96 are radially disposed relative to the center 98 of the mounting plate 78. However, they are inclined relative to a line that passes through the center 98 and through the aligned elongated slot 76. When there is a five lug bolt pattern on which the mounting plate 78 is to be mounted, as is shown in FIG. 9, three in number of the sleeves 66, 90 and 92 are required to be used rather than the previous embodiments lug bolt patterns where only two in number of the sleeves 66 required.

The mounting plate 78 has a peripheral edge 100. Formed within the mounting plate 78 is an engagement structure in the form of an annular groove 102. The annular groove 102 has an annular wall surface 104 which is located parallel to and directly adjacent the peripheral edge 100. Normally, the annular groove 102 will be located no more than one-quarter or one-half of an inch away from the peripheral edge 100.

The fingers 38, 40 and 42 are to be mounted in conjunction with the annular groove 102. The fingers 38, 40 and 42 are then moved in an outwardly direction and pressed tightly against annular wall surface 104. The fingers 38, 40 and 42 are then locked in this position. The sensing head 20 is now fixedly mounted onto the mounting plate 78 which is in turn fixedly mounted onto the wheel hub from which lug bolts 70 extend and pass through the tire rim 58. The alignment instrument, in the form of a sensing head 20, can now be used in a conventional manner to affect the desired necessary alignment of the vehicle.

It is to be understood that there should be four in number of the sensing heads 20, one for each vehicular wheel and therefore there will be four in number of the mounting plates 78.

What is claimed is:

1. A method of aligning a vehicular wheel comprising the steps of:

removing at least two lug nuts of a vehicular wheel;

installing with conjunction with said vehicular wheels at each location of a removed lug nut an elongated sleeve which has an internally threaded through hole and which is substantially longer than the removed nut;

securing onto said elongated sleeve by screw fasteners which threadably engage with said through hole a mounting plate which has a center and a peripheral edge, an annular wall located directly adjacent the peripheral edge and facing said center;

tightening of said screw fasteners so that said mounting plate is tightly mounted on said vehicular wheel; and installing a conventional alignment instrument in a fixed position onto said mounting plate by being pressed tightly against said annular wall.

2. The method as defined in claim 1 wherein the step of securing includes selecting a circular mounting plate.

3. The method as defined in claim 1 wherein said annular wall is created by forming a groove within said mounting plate.

4. A mounting system for an alignment instrument for a vehicular wheel comprising:

a mounting plate, said mounting plate having a peripheral edge, an engagement means located on said mounting plate directly adjacent said peripheral edge;

spacing means for mounting said mounting plate in a spaced position from said vehicular wheel but in juxtaposition to said vehicular wheel and in a fixed relationship to said vehicular wheel;

a fastener assembly secured to said spacing means, said fastener assembly connecting with said mounting plate and connecting with said spacing means; and said alignment instrument to be clamped onto said mounting plate by being forced outwardly against said engagement means.

5. The mounting system as defined in claim 4 wherein:

said mounting plate being circular.

6. The mounting system as defined in claim 5 wherein:

said engagement means comprising an annular groove.

7. The mounting system as defined in claim 4 wherein:

said spacing means comprising a plurality of sleeves each of which have an internally threaded through opening, each said sleeve being substantially longer in length than a lug nut of said vehicular wheel.

8. The mounting system as defined in claim 7 wherein:

each of said sleeves being of the same length.

9. A mounting system adapted to mount an alignment instrument on a vehicular wheel which is fixedly mounted on a wheel hub assembly comprising:

a mounting plate, said mounting plate having a peripheral edge and an engagement means, [located directly adjacent said peripheral edge], spacing means for fixedly mounting said mounting plate in a spaced position from the vehicular wheel;

a fastener assembly secured to said spacing means, said fastener assembly connecting with said mounting plate; and the alignment instrument adapted to be clamped onto said mounting plate by engaging said engagement means.

10. The mounting system as defined in claim 9 wherein:

said mounting plate being circular.

11. The mounting system as defined in claim 10 wherein:

said engagement means comprising an annular groove.

12. The mounting system as defined in claim 9 wherein:

said spacing means comprising a plurality of sleeves each of which have an internally threaded through opening, each said sleeve being substantially longer in length than a lug nut of said vehicular wheel.

* * * * *